United States Patent [19]

Arras

[11] 3,842,220

[45] Oct. 15, 1974

[54] METHOD FOR DETECTING FAULTS IN REGENERATORS IN A PCM-SYSTEM

[75] Inventor: Juho Arras, Stockholm, Sweden

[73] Assignee: Telefonaktiebolaget LM Ericsson, Stockholm, Sweden

[22] Filed: Jan. 15, 1973

[21] Appl. No.: 323,919

[30] Foreign Application Priority Data

Jan. 27, 1972 Sweden .............................. 915/72

[52] U.S. Cl. .............................. 179/175.31 R
[51] Int. Cl. .............................. H04b 3/46
[58] Field of Search ............ 179/175.31 R, 175.3 R

[56] References Cited

UNITED STATES PATENTS

| | | | |
|---|---|---|---|
| 3,371,165 | 2/1968 | Earle et al. | 179/175.3 |
| 3,586,968 | 6/1971 | Barjot | 179/175.31 R |
| 3,649,777 | 3/1972 | Matsushima | 179/175.31 R |
| 3,760,127 | 9/1973 | Camiciottoli et al. | 179/175.31 R |
| 3,764,760 | 10/1973 | Marchini | 179/175.31 R |
| 3,770,913 | 11/1973 | Camiciottoli et al. | 179/175.31 R |

*Primary Examiner*—Kathleen H. Claffy
*Assistant Examiner*—Douglas W. Olms
*Attorney, Agent, or Firm*—Hane, Baxley & Spiecens

[57] ABSTRACT

A PCM transmission link system is provided with a fault location network for detecting faults in regenerators arranged between terminals in both transmission directions. All amplifiers in each of the regenerators are connected to a band-pass filter with a pass frequency allocated to the respective regenerator. Only every second terminal is provided with a fault location device while the other terminals are provided with pulse train converters. The fault location is connected to one of the links outgoing from the fault location terminal and produces pulse trios and pulse duos for fault location in the outgoing and incoming transmission direction, respectively. The pulse train converters receive the pulse duos and converts them to pulse trios. Pulse trios produced by a pulse train converter are transferred on links incoming to the fault location terminal. The trio pulse trains, both on the outgoing and on the incoming links, contain as a frequency component one of the pass frequencies which is filtered out by the aid of a respective filter. An obtained sinusoidal pass frequency signal shows that no fault exists in the supervised transmission direction up to the respective regnerator.

5 Claims, 4 Drawing Figures

METHOD FOR DETECTING FAULTS IN REGENERATORS IN A PCM-SYSTEM

Figure 1:
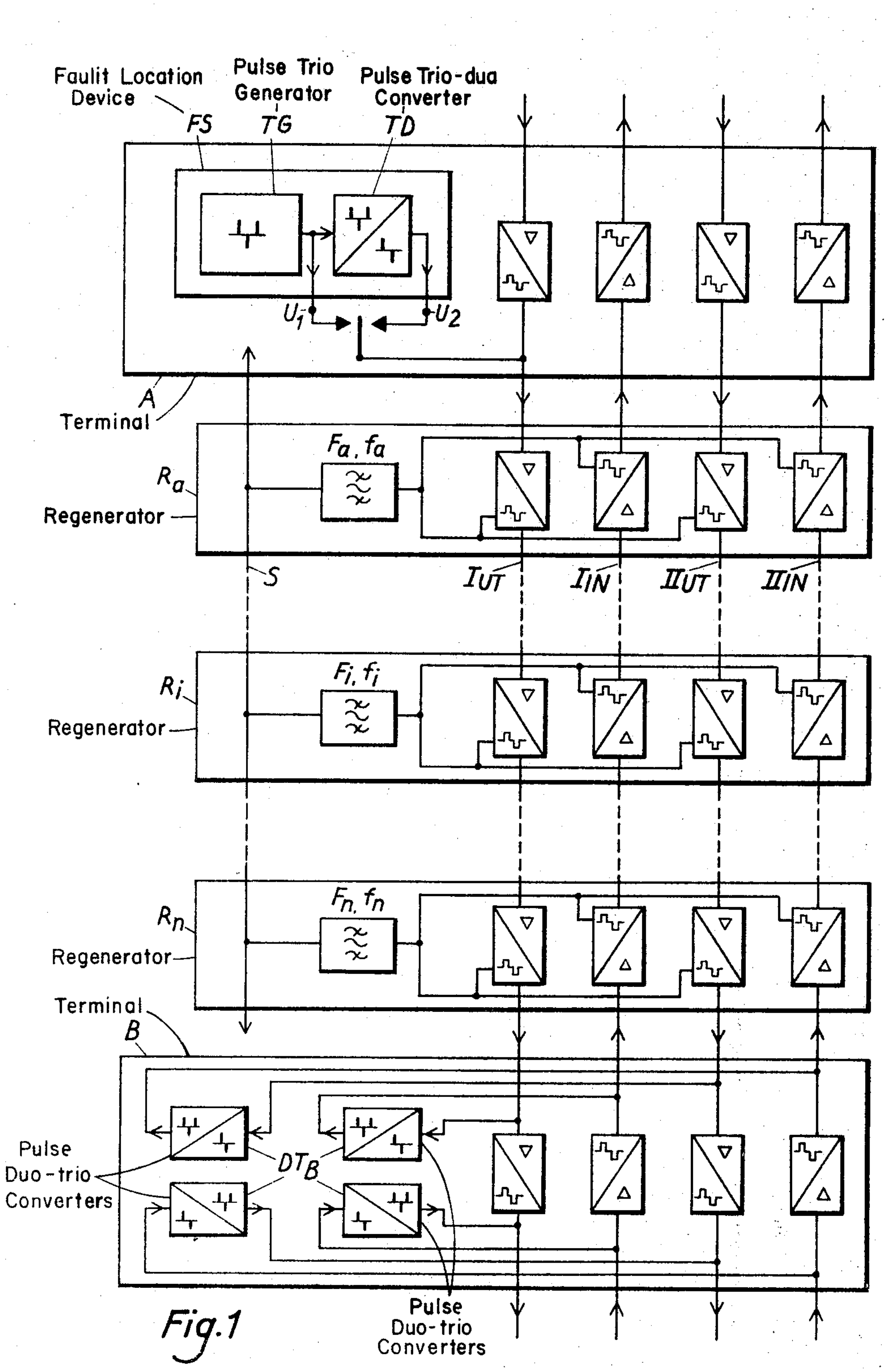

This invention refers to a method for detecting faults in regenerators in a PCM-system wherein the regenerators are arranged in both transmission directions of the system between terminals with only every second terminal being provided with a fault location device and all amplifiers in each of the regenerators being connected to a band-pass filter having a pass frequency allocated to the respective regenerator.

A PCM-system includes terminals between which PCM-words are transmitted through links. Each link is a one-way link, a plurality of links for each transmission direction being located parallelly and the PCM-words have usually to be regenerated a number of times during the transmission. The regeneration of the PCM-words is carried out by unattended regenerators each of which comprises for each link a digital intermediate amplifier.

In "Marconi Instrumentation, Vol. 11, No. 3(A) and Vol. 12 No. 4" there is described a method for detecting which intermediate amplifier in a faulty link connection is out of operation. Via a common fault location filter of the band-pass type, in each regenerator, the intermediate amplifiers are connected to a service line between the respective terminals. The pass frequency of the filter identifies the respective regenerator. From a fault location device there is transmitted to the faulty link a pulse train containing, as a frequency component, the pass frequency for the filter in that regenerator which is located nearest to the terminal from which the faulty link is outgoing. If said pass frequency is received as a signal on the service line, there is no fault in the intermediate amplifier of the respective regenerator whereupon the fault locating continues with a pulse train containing the pass frequency for the next regenerator in the respective transmission direction until the fault has been found in that intermediate amplifier from where the signal on the service line is not received.

The pulse trains for the fault locating consist of pulse trios the three pulses of which have alternating polarity. A pass frequency component in the pulse train is obtained if during the one halves of the periods of the pass frequency (−+−) — trios and during the other halves (+−+) — trios are transmitted.

With the known method described above faults can be located on links having a transmission direction outgoing from the terminal, thus in order to get a complete supervising of the system, control is demanded from all terminals.

In order to locate faults on links having a transmission direction incoming to the terminal, it is not sufficient to feed such a faulty link with the pulse train consisting of pulse trios via a faultless or fault-free outgoing link and a loop connection device in that terminal from which the faulty link is outgoing, since on the service line all pass frequency signals would be received via the intermediate amplifiers in the faultless link. In order to avoid, for example, the arrangement of two service lines for two fault location filters in each regenerator, one for each transmission direction, it is proposed in "Telecomunicazioni (Siemens-Italien) No. 39 — (1971), page 11–28" to provide the filter device in each regenerator with blocking circuits and to guide the connection of the filter to amplifiers in the respective transmission direction by means of D.C.-potentials superposed on the service line. This does not merely imply a rise in the cost for each regenerator but the blocking circuits cause, furthermore, together with the potential differences arising along the service line, sources of errors for the procedure of supervision.

An object of the invention is to achieve from a terminal improved fault location on links outgoing from and incoming to said terminal, so that in a chain of terminals only every second terminal must be tested for control measurement, without providing the fault location filters in the regenerators with blocking circuits controlled by D.C.-potentials on the service line.

Figures 2, 3, 4:
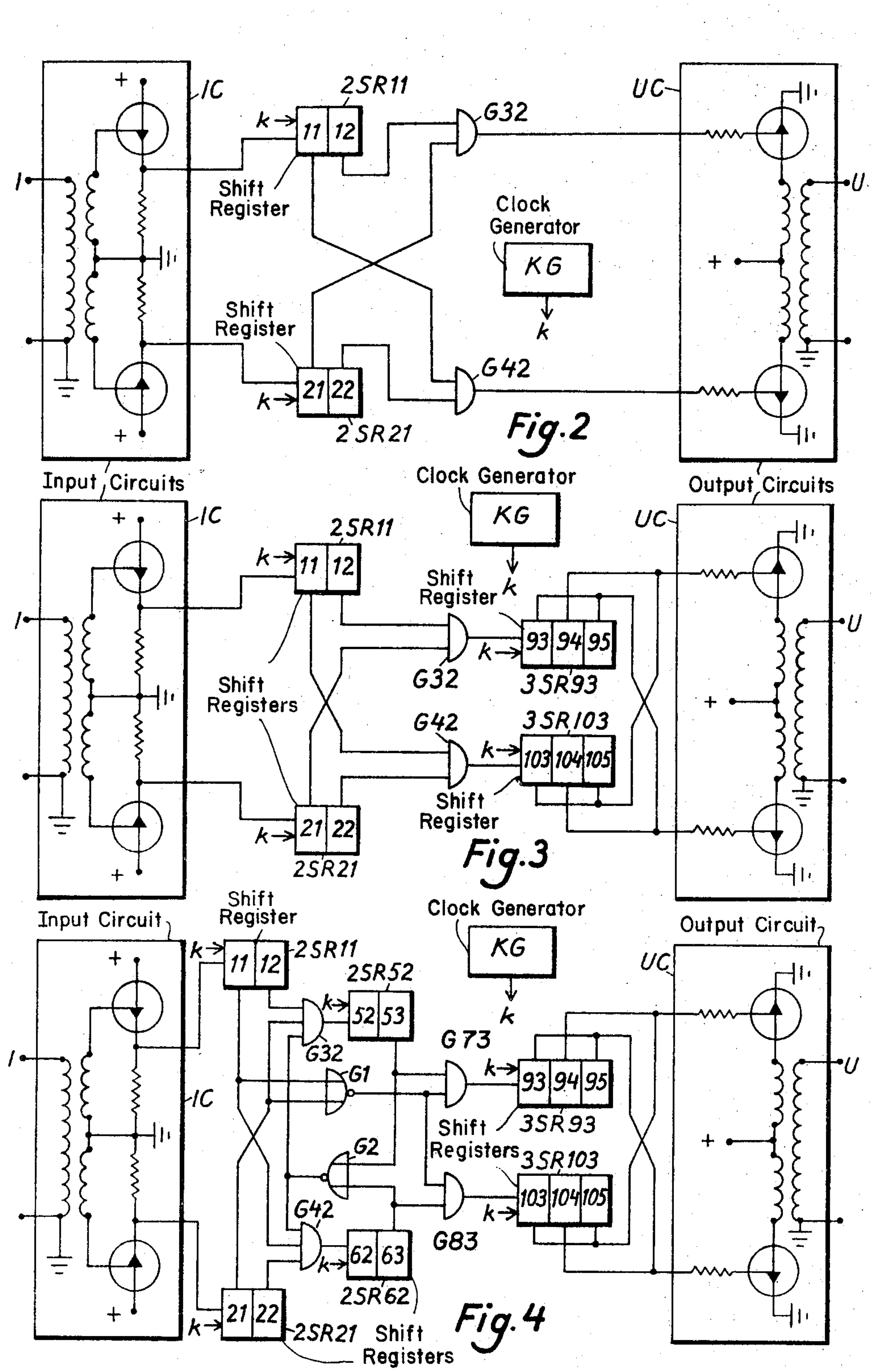

The invention which is defined by the appended claims will be described in greater detail by means of the accompanying drawing, in which FIG. 1 shows two terminals with link connections and regenerators therebetween. FIG. 2 shows a trio-duo pulse train converter, and FIG. 3 and FIG. 4 show embodiments for duo-trio pulse train converters.

FIG. 1 shows two links I and II in each transmission direction out and in, three regenerators $R_a$, $R_i$ and $R_n$ out of n regenerators, each having four digital intermediate amplifiers and a fault location filter F with a pass frequency $f$ allocated to the respective regenerator, and also the service line S between the filters and the terminals A and B.

It is assumed that the fault location is effected from the terminal A and that a two-way connection consisting of the links $I_{ut}$ and $I_{in}$ is to be supervised.

A fault location device FS for carrying out the method according to the invention has a first output $U_1$ for the sending of pulse trains consisting of pulse trios as described above, and a second output $U_2$ for sending out pulse trains consisting of pulse duos the pulses of which are of different polarity and the first pulses of which shift polarity concurrently with a selected pass frequency. Concerning the pass frequency component contained in the trio pulse train, as explained above, for the duo pulse train it may be stated that the frequency component indeed exists but that its amplitude is zero. For this reason a duo pulse train, for example on the outgoing link $I_{ut}$, does not cause any pass frequency signals on the service line.

For fault locating on the outgoing link $I_{ut}$ this link is, according to the invention, connected to said first output of the fault location device and, as mentioned above, the fault location device will first be set to the pass frequency $f_a$ of the regenerator $R_a$ located nearest to the terminal A and then the pass frequency will be switch progressively to $f_i$ and to $f_n$ in order to supervise the intermediate amplifiers in that consecutive order which is defined by the increasing distance from the terminal A.

For fault locating on the link $I_{in}$ the outgoing link in $I_{ut}$ is connected, according to the invention, to the second output of the fault location device. The figure shows that the link $I_{ut}$ in the terminal B is connected to a pulse train converter $DT_B$ which converts each received pulse duo into a pulse trio and sends out this to the link $I_{in}$ incoming to the terminal A. However, the converter $DT_B$ does not react on incoming PCM-words and pulse trios. Otherwise the converter may be of such a type which, for example by means of shift registers, adds after a pulse duo a third pulse the polarity of which is identical with the polarity of the first pulse in said pulse duo, or alternatively of such a type which generates a (−+−) — trio and a (+−+) — trio respectively out of a (+−) — duo and a (−+) — duo respectively.

The terminal B contains for each two-way link connection a converter $DT_B$ as it is shown in FIG. 1.

Upon fault locating on the link $I_{in}$, at first the pass frequency $f_n$ will be set so as to end successively with the pass frequency $f_a$. In this way the fault location filters are not fed via the intermediate amplifiers of the link $I_{ut}$, and fault detections are carried out by means of the pass frequency signals incoming via the service line S to the fault location device in the terminal A.

The fault location device FS used accordingly to the invention contains in a first embodiment, shown in FIG. 1, a known pulse trio generator TG, for example of the Marconi type TF 2341, the output of which constitutes the first output and is connected to a pulse train converter TD the output of which constitutes the second output and which cancels the first or the third pulse of each pulse trio. A second embodiment of the fault location device contains a generator for the duo pulse train. The output of the pulse duo generator constitutes the second output and is connected to a pulse train converter $DT_A$ the output of which constitutes the first output and which is identical in principle with the converters $DT_B$ arranged in the terminal B.

FIG. 2 shows in greater detail an embodiment for a pulse train converter TD according to FIG. 1, which converts each pulse trio received on the input I into a pulse duo on the output U of the converter. An input circuit IC separates the incoming pulses dependent on their polarity, so that a first position 11 and 21 respectively of a first two-position shift register 2SR11 and 2SR21, respectively, is 1 — set by a received pulse having the one and the other polarity respectively. The converter is controlled from the clock generator KG of the terminal as it is shown in the figure. The outputs of the shift registers 2SR11 and 2SR21 are connected to AND-circuits or gates G32 and G42 in a manner, that gate G32 and gate G42 are activated when the second position 12 and 22 of the shift register 2SR11 and 2SR21 respectively as well as the first position 21 and 11 respectively of the shift register 2SR21 and 2SR11 respectively are set to 1. The gates G32 and G42 are connected to an output circuit UC on the output of which pulses with the one and the other polarity respectively are generated depending on a 1-signal received from gate G32 and G42 respectively.

Accordingly, two successive pulses of different polarity on the input I generate a signal on the output of either gate G32 or gate G42 and a pulse trio generates a pulse from gate G32 before and after respectively a pulse from the gate G42, depending on the polarity of the first pulse in said pulse trio. Each interval period between the pulses on the input I interrupts the pulses from the gates G32 and G42 and since a trio pulse train always contains at least one interval period between two trio groups, the trio pulse train will be converted in such a way that on the output U a duo pulse train is generated, having at least two interval periods between two duo groups.

FIG. 3 shows in greater detail an embodiment for an above-mentioned pulse train converter $DT_A$ which converts each duo group received from a pulse duo generator into a trio group and which is identical with the converter TD according to FIG. 2 with the exception of a three-position shift register 3SR93 and 3SR103 respectively which is connected between gate G32 and G42 respectively and output circuit UC, so that a signal from gate G32 and gate G42 respectively sets to 1 the first position 93 and 103 respectively of the shift register 3SR93 and 3SR103 respectively and so that a 1-set first position 93, third position 95 of the shift register 3SR93 and second position 104 of the shift register 3SR103 respectively generates on the output U a pulse of the one polarity, while a 1-set first position 103, third position 105 of the shift register 3SR103 and second position 94 of the shift register 3SR93 respectively generates on the output U a pulse of the other polarity.

In this way the converter $DT_A$ converts a duo group followed by two interval periods into an interval period followed by a trio group.

FIG. 4 shows in greater detail an embodiment for a pulse train converter $DT_B$ according to FIG. 1, which, besides the capacity for duo-trio converting, has the property of not reacting to a trio pulse train or to PCM-words which constitute an arbitrary pulse train without interval periods. In order to achieve such inhibiting properties the converter $DT_B$ is provided, in relation to the converter $DT_A$ according to FIG. 3, with a further pair of second two-position shift registers 2SR52–2SR62, a pair of AND-gates G73-G83 and two NOR-gates G1 and G2. The first position 93 and 103 respectively of shift register 3SR93 and 3SR103 respectively receives a signal from gate G73 and G83 respectively when the second position 53 and 63 respectively of the shift register 2SR52 and 2SR62 respectively is set to 1 and when the output of said NOR-gate G1 is active as a consequence of 0-set first positions 11 or 21 of the shift registers 2SR11 and 2SR21, i.e. as a consequence of an interval period on the input I. The first position 52 and 62 respectively of shift register 2SR52 and 2SR62 respectively is connected to the output of the gate G32 and G42 respectively which is provided with a third input controlled by said NOR-gate G2 the inputs of which are connected to the second positions 53 and 63 of the shift registers 2SR52 and 2SR62. Thus the NOR-gate G2 prevents a 1-setting of the first positions 52 or 62 when one of the second positions 53 and 63 is set to 1.

In comparison with the conversion in the converter $DT_A$ the pair of shift registers 2SR52–2SR62 in the converter $DT_B$ delay the conversion of a pulse duo into a pulse trio by one pulse period. PCM-words are blocked by means of said NOR-gate G1 which blocks the signal transmission to the shift registers 3SR93 and 3SR103. During the last pulse of a pulse trio the gates G32 and G42 are blocked by means of the NOR-gate G2, so that in the interval period following after a pulse trio the second positions 53 and 63 of the shift registers 2SR52 and 2SR62 and consequently also the shift registers 3SR93 and 3SR103 remain in 0-set position.

I claim:

1. Method for detecting faults in the links between first and second terminals of a PCM transmission system wherein the pulse trains are transmitted via at least one stage of regeneration in each direction comprising the steps of: for fault location in a first link having a transmission direction from the first terminal to the second terminal, transmitting from the first terminal on the first link a pulse train including first pulse trios, the three pulses of each first pulse trio having alternating polarities with the first pulse of each such trio shifting polarity in synchronism with a pass frequency selected and allotted to the one stage of regeneration, filtering the first pulse trios regenerated by said one stage to select a sinusoidal signal having the selected pass frequency, and transmitting the selected sinusoidal signal, if present, to indicate that the transmission from the first terminal through the one stage of regeneration was fault free; and for fault location in a second link having a transmission direction from the second terminal to the first terminal, transmitting from the first terminal on the first link, a pulse train including pulse duos, the two pulses of each pulse duo having opposite polarities, and the first pulse of each pulse duo shifting polarity in synchronism with said selected pass frequency, at the second terminal converting the pulse duos to second pulse trios having the same properties as the pulse trios transmitted from the first terminal during the fault location in said first link, transmitting from the second terminal the second pulse trios on the second link, filtering the second pulse trios regenerated by the one stage in the second link to select a sinusoidal signal having said selected pass frequency, and transmitting the selected sinusoidal signal, if present, to indicate that the transmission from the second terminal through the one stage of regeneration in the second link was fault free.

2. The method of claim 1 wherein are a plurality of stages of regeneration in each link and wherein each stage in each of the links is assigned a different pass frequency, further comprising, when generating the first pulse trios and the pulse duos, generating such pulses to be sequentially in synchronism with each of the different pass frequencies and when filtering at each regeneration to select the pass frequency assigned to the stage.

3. In a PCM system having a first and second terminal connected by at least a first link for transmitting pulses in a first direction from the first terminal to the second terminal and at least a second link for transmitting pulses in a second direction from the second terminal to the first terminal, and having a plurality of regenerator stages, each of the regenerator stages having an amplifier for each of the links and a filter for receiving signals from all of the amplifiers in the stage, the filter of each of the stages having a unique pass frequency associated with the stage, means connected to the outputs of all the filters for receiving the pass frequency signals from the filters to indicate the operativeness state of the regenerator stages, and at the first terminal for connection to said first link, a first generator means for sequentially generating a plurality of different packets of pulses wherein each of said packets is associated with a different one of said regenerator stages and wherein each packet comprises a plurality of pulse trios with the three pulses alternating in polarity and the first pulses of the trios shifting polarity in synchronism with the pass frequency of its associated stage, so that the location of faults in said first link can be indicated, apparatus for indicating the location of faults in said second link comprising at the first terminal means a second generator means for sequentially generating a plurality different second packets of pulses wherein each of said second packets is associated with a different one of said regenerator stages and wherein each of said second packets comprises a plurality of pulse duos with the two pulses of each duo having opposite polarities and interchanging polarities in synchronism with the pass frequency of its associated stage, means for selectively connecting said second generator means to the first link to the exclusion of said first generator means, and converter means in the second terminal having an input connected to said first link and an output connected to said second link and including means for converting pulse duos received from said first link to pulse trios for transmission on said second link.

4. The apparatus of claim 3 wherein said second pulse generator means receives pulse trios from said first pulse generator means and includes means for converting the pulse trios to pulse duos.

5. The apparatus of claim 3 wherein said first pulse generator means receives pulse duos from said second pulse generator means and includes means for converting the pulse duos to pulse trios.

* * * * *